United States Patent
Lee

(10) Patent No.: US 8,645,756 B1
(45) Date of Patent: Feb. 4, 2014

(54) SYSTEMS AND METHODS FOR REMOTELY TROUBLESHOOTING A SOFTWARE PROBLEM OCCURRING ON A COMPUTING DEVICE

(75) Inventor: Elliott Lee, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 460 days.

(21) Appl. No.: 13/009,068

(22) Filed: Jan. 19, 2011

(51) Int. Cl.
*G06F 11/00* (2006.01)
(52) U.S. Cl.
USPC .......................................................... 714/26
(58) Field of Classification Search
USPC ............................................................ 714/26
See application file for complete search history.

(56) References Cited

U.S. PATENT DOCUMENTS

| | | | |
|---|---|---|---|
| 2004/0078721 A1* | 4/2004 | Williams | 714/46 |
| 2005/0216784 A1* | 9/2005 | Srinivasan et al. | 714/4 |
| 2009/0299900 A1* | 12/2009 | Chen | 705/40 |

\* cited by examiner

*Primary Examiner* — Bryce Bonzo
(74) *Attorney, Agent, or Firm* — Holland & Hart LLP

(57) ABSTRACT

A computer-implemented method to remotely troubleshoot a software problem occurring on a first device. A connection is established by a second device with the first device. The second device extracts a first set of information from the first device. The second device provides a user interface via a display in order to receive a second set of information. The second device transmits the first set of information and the second set of information to a third device.

20 Claims, 7 Drawing Sheets

SYSTEMS AND METHODS FOR REMOTELY TROUBLESHOOTING A SOFTWARE PROBLEM OCCURRING ON A COMPUTING DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone who uses and relies on computers.

Software may be installed on computers to provide various functionalities. For example, software may be installed on a computer to detect and identify possible threats to the computer (e.g., viruses, malware, worms, etc.). In some instances, the software may not operate correctly after being installed on a computer. In addition, the user of the computer may not fully understand the capabilities of the software and may have questions relating to the functionality of the software. Further, a virus (or other harmful malware) may infect a computer, causing the computer to malfunction. In some cases, the user may not be able to use the computer to request assistance from the creator of the software. For example, if the computer is malfunctioning, the user may not desire to connect the computer to an external network (for safety precautions) in order to receive troubleshooting assistance from a server of the company that created the software. As a result, benefits may be realized by providing systems and methods for remotely troubleshooting a software problem occurring on a computing device.

SUMMARY

According to at least one embodiment, a computer-implemented method to remotely troubleshoot a software problem occurring on a first device is described. A connection is established by a second device with the first device. The second device extracts a first set of information from the first device. The second device provides a user interface via a display in order to receive a second set of information. The second device transmits the first set of information and the second set of information to a third device.

The second device may receive a solution to the software problem from the third device. In one embodiment, the second device may provide the solution to the software problem to the first device via the established connection between the first device and the second device. The first set of information may include information relating to the software problem occurring on the first device. The first set of information may include information relating to a current state of the first device. In one configuration, the second set of information may include input from a user relating to the software problem occurring on the first device.

In one example, the second set of information may be arranged into a predetermined format to be received by the third device. The first device may be a personal computing device and the second device may be a smartphone computing device. The solution to the software problem may include instructions to troubleshoot the software problem occurring on the first device.

A computing device configured to remotely troubleshoot a software problem occurring on a second device is also described. The computing device may include a processor and memory in electronic communication with the processor. The computing device may also include an application configured to establish a connection between the computing device and the second device, and extract a first set of information from the second device. The computing device may further include a display configured to provide a user interface in order to receive a second set of information. The application further may be configured to transmit the first set of information and the second set of information to a third device.

A computer-program product to remotely troubleshoot a software problem occurring on a first device is also described. The computer-program product may include a non-transitory computer-readable medium having instructions thereon. The instructions may include code programmed to establish a connection with the first device, and code programmed to extract a first set of information from the first device. The instructions may further include code programmed to provide a user interface via a display in order to receive a second set of information, and code programmed to transmit the first set of information and the second set of information to a third device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
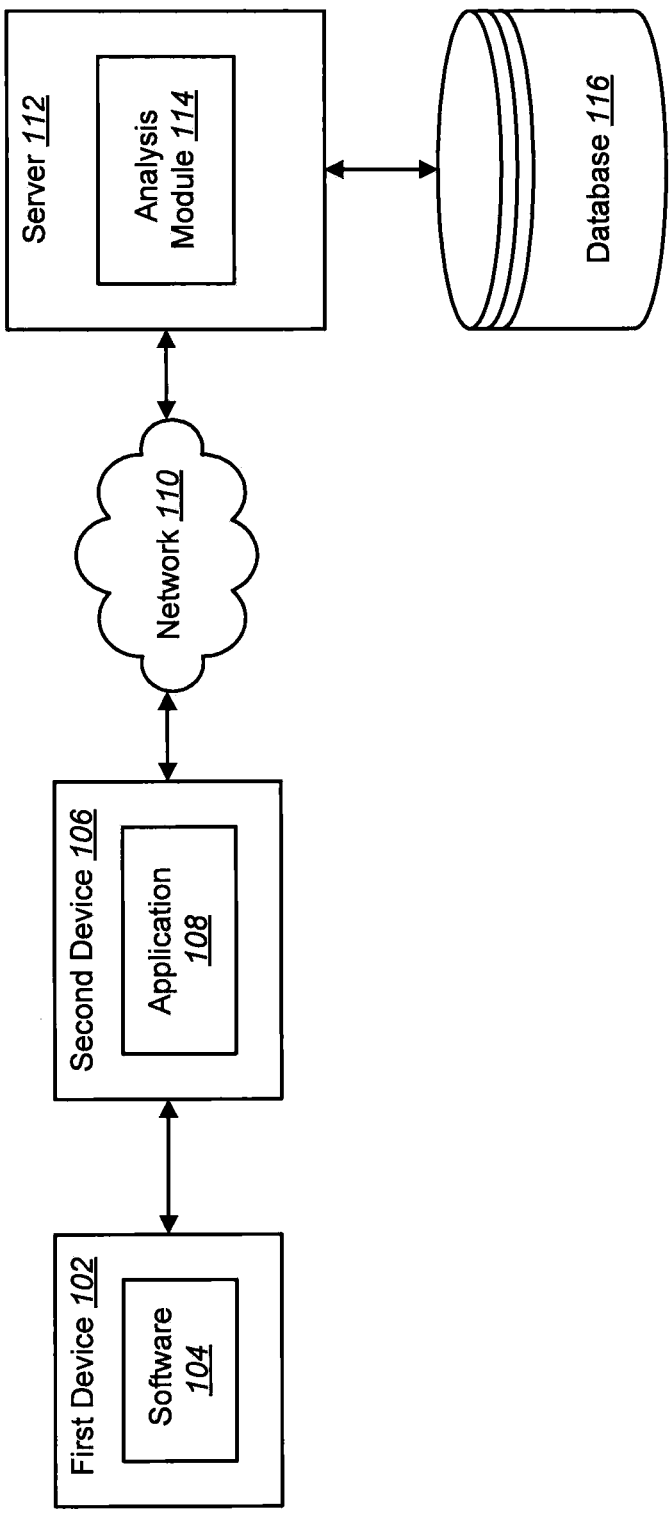
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Software producing companies may sell software products to consumers. The software products may be installed on the consumer's computing devices. In some instances, the software products may not execute correctly. This may cause behavioral problems to occur on the computing device. In addition, the consumer may not fully understand how the software is supposed to execute. For example, the software may be designed to identify and eradicate viruses on the computing device. The software may not be correctly performing these tasks and the user may desire to troubleshoot this problem in order to fix the software. Further, the software may, for some reason, cause the computing device to malfunction (e.g., crash).

When software installed on a computing device is not executing correctly, the computing device may not function correctly. As a result, the user may not be able to connect to an external network (e.g., Internet) in order to transmit information about the problem to a server of the software company. Likewise, the user may not be able to connect to the external network using the computing device in order to receive a patch or other solution to the problem.

The present systems and methods assist users in troubleshooting problems occurring on computing devices. In one configuration, the present systems and methods allow users to troubleshoot software problems remotely. Details regarding the present systems and methods will now be described below.

FIG. 1 is a block diagram illustrating one embodiment of an environment in which the present systems and methods may be implemented. In one configuration, a first device 102 may install and execute software 104. The software 104 may perform functions relating to, but not limited to, virus detection, malware detection, enterprise management, and the like. In one example, the first device 102 may be a computing device, such as, but not limited to, a personal computer (PC), a server, a laptop, a smartphone, or any other type of computing device.

In one embodiment, a second device 106 may establish a connection with the first device 102. The second device 106 may also be a computing device, such as, but not limited to, a PC, a server, a laptop, a smartphone, and the like. The second device 106 may establish any type of connection with the first device 102, such as, but not limited to, a wireless connection, a wired connection (e.g., universal serial bus (USB) connection, Ethernet connection, etc.), a connection via a local network, a connection via an intranet, and the like. In one configuration, the second device 106 may execute an application 108. The application 108 may retrieve information regarding the software 104 and the behavior of the first device 102. In one embodiment, the application 108 may also retrieve additional information from a user via a user interface displayed on a display of the second device 106. In one example, the information retrieved by the application 108 may be transmitted to a remote server 112 across a network connection 110.

The remote server 112 may include an analysis module 114 that may analyze the information received from the second device 106. In one example, the received information may be regarding a problem with the software 104 executing on the first device 102. The analysis module 114 may access a database 116 that may store solutions to various software problems. These solutions may include patches, scripts, etc. that may solve the problem associated with the software 116. The remote server 112 may transmit back to the second device 106 a solution (if a solution exists) to the software problem. The second device 106 may apply the solution to the first device 102 in order to correct the problem associated with the software 104.

Figure 2:
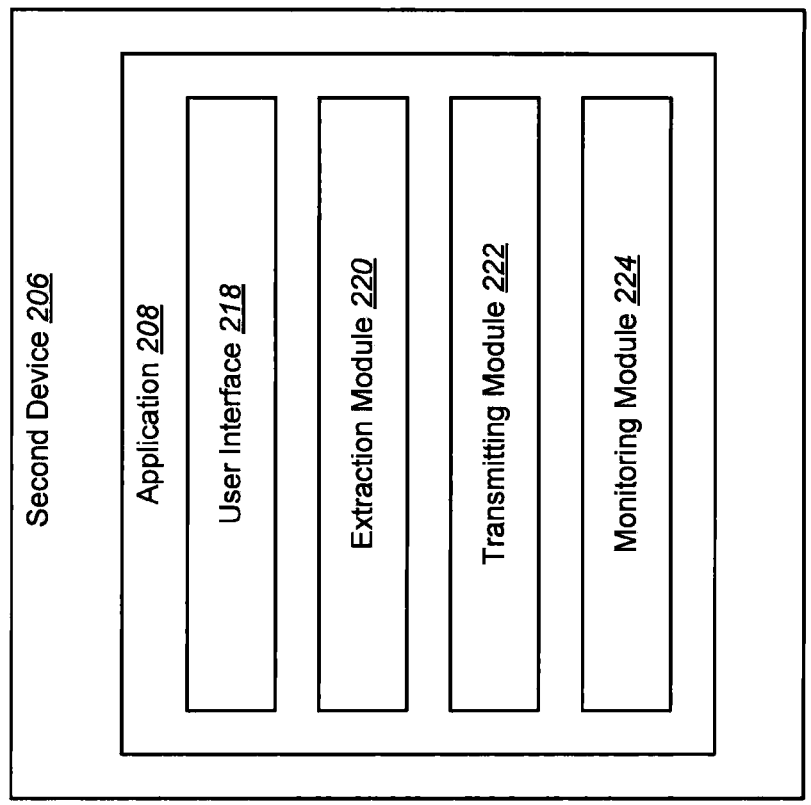
FIG. 2 is a block diagram illustrating one embodiment of a second device executing an application in accordance with the present systems and methods.

FIG. 2 is a block diagram illustrating one embodiment of a second device 206 executing an application 208 in accordance with the present systems and methods. The application 208 may be used to connect to a first device 102 that may be experiencing a problem with software 104 installed on the first device 102. The application 208 may include a user interface 218 that may allow a user of the second device 206 to interface with the application 208. The user interface 218 may guide the user to provide information regarding the problem occurring on the first device 102. The user interface 218 may arrange the information received from the user into a specified format. As a result, the information from the user may be transmitted to the remote server 112 in the specified format to the server 112. For example, the user interface 218 may arrange the information received from the user into a form that is recognizable and expected by the server 112. The user interface 218 may present questions to the user to assist the user to adequately describe the problem occurring on the first device 102. In one embodiment, the user may describe the problem via the user interface 218 by describing the behavior of the first device 102. The user may also submit questions relating to the functions of the software 104 via the user interface 218.

In one embodiment, the application 208 may also include an extraction module 220. The extraction module 220 may extract information from the first device 102 about the software 104 executing on the first device 102. In other words, the extraction module 220 may extract information about the problem occurring in the first device 102 related to the software 104. The extracted information may be contextual information about the problem, information about the current state of the first device 102 (e.g., idle, powered down, non-responsive, etc.), and the like.

The application 208 may include a transmitting module 222 that may transmit the information gathered by the user interface 218 and the extraction module 220. The information may be transmitted to a remote server 112. As previously explained, the information may describe a problem occurring on the first device 102 that is executing the software 104. In one embodiment, the application 208 may also include a monitoring module 224. The monitoring module 224 may monitor additional devices (such as the first device 102) for changes in behavior that may indicate a problem is occurring on the device. If the monitoring module 224 detects a problem on a device, the user interface 218 and the extraction module 220 may gather information about the problem as described above.

Figure 3:
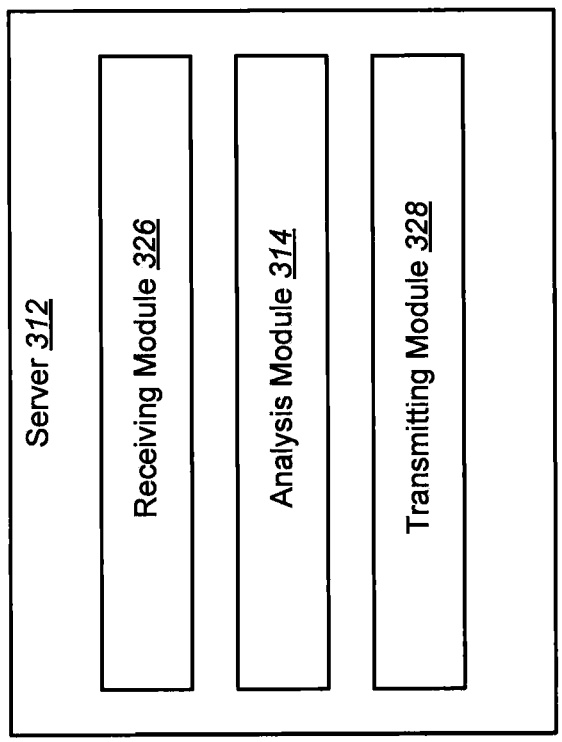
FIG. 3 is a block diagram illustrating one embodiment of a server that may implement the present systems and methods.

FIG. 3 is a block diagram illustrating one embodiment of a server 312 that may implement the present systems and methods. The server 312 may include a receiving module 326 that may receive information from a second device 106 that describes a problem occurring on a first device 102. The server 312 may further include an analysis module 314 that may analyze the information received from the second device 312. The analysis module 314 may determine a possible solution that may be applied to the problem described in the information received from the second device 106. The analysis module 314 may search a database 116 for the possible solution. If the solution exists in the database 116, the server 312 may transmit the solution to the second device 106 via a transmitting module 328. The solution may include a software patch, a software update, instructions, a script, a software tool, and the like. If the analysis module 314 cannot identify a solution for the problem or if a solution does not exist in the database 116, the server 312 may transmit a notification message to the second device 106 indicating that a solution to the problem is not available. Alternatively, the server 312 may transmit alternative solutions to the second device 106 if a primary solution is not identified and/or available.

Figure 4:
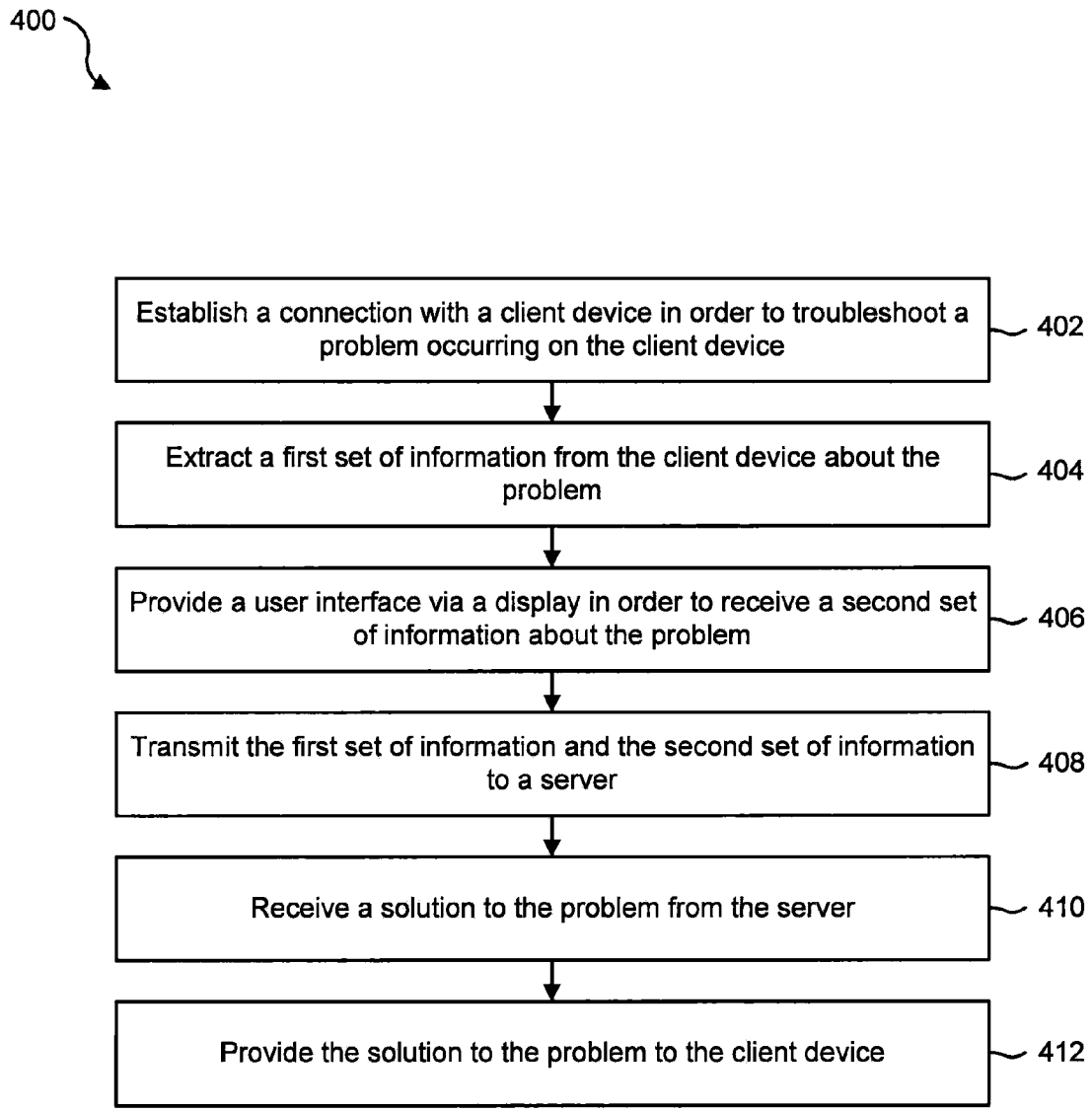
FIG. 4 is a flow diagram illustrating one embodiment of method to remotely troubleshoot a software problem.

FIG. 4 is a flow diagram illustrating one embodiment of method 400 to remotely troubleshoot a software problem. The method 400 may be implemented by the application 108 executing on the second device 106.

In one configuration, a connection may be established 402 between the second device 106 and a client device in order to troubleshoot a problem occurring on the client device. A first set of information may be extracted 404 from the client device. In one embodiment, the first set of information may be related to the problem occurring on the client device. In one configuration, a user interface may be provided 406 via a display in order to receive a second set of information about the problem. The second set of information may be provided (via the user interface) by a user of the second device 106. The second set of information may be arranged or formatted into a predefined form. The first set of information and the second set of information may be transmitted 408 to a remote server. In one embodiment, a solution to the problem may be received 410 from the server. The solution to the problem may be provided 412 to the client device via the established connection between the second device and the client device. For example, if the problem is malware, the solution may include a tool to correct the malware. The tool may be downloaded to the second device and then provided to the client device via the connection between the client device and the second device.

Figure 5:
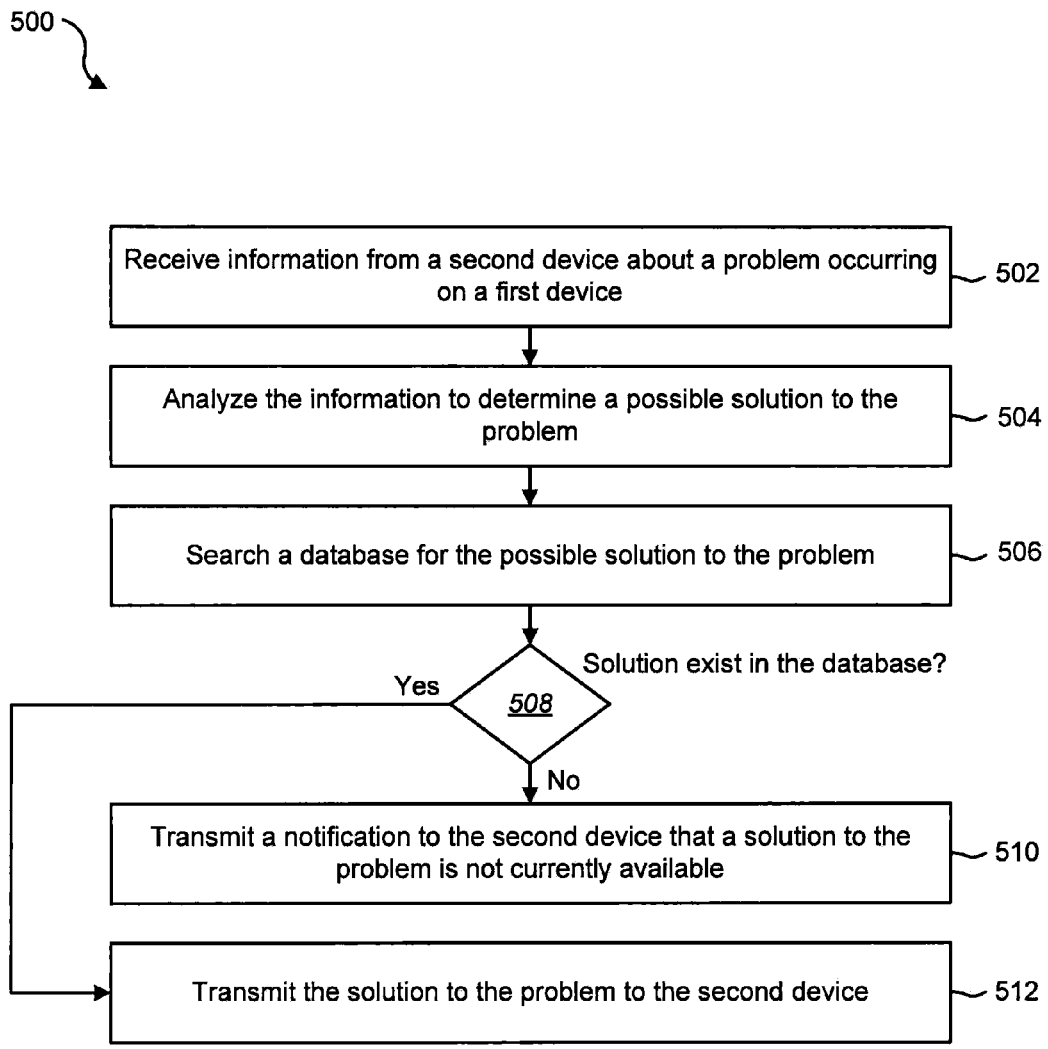
FIG. 5 is a flow diagram illustrating one embodiment of a method to provide a solution to the software problem occurring on a remote client device.

FIG. 5 is a flow diagram illustrating one embodiment of a method 500 to provide a solution to a software problem occurring on a remote client device. In one configuration, the method 500 may be implemented by a server 112.

In one embodiment, information may be received 502 from a second device. The information may be related to a problem occurring on a first device that is connected to the second device. The information may be analyzed 504 to determine a possible solution to the problem. A database may be searched 506 for the possible solution to the problem. In one example, a determination 508 may be made as to whether a solution exists in the database. If it is determined 508 that a solution does not exist in the database 116, a notification may be transmitted 510 to the second device. The notification may indicate that a solution to the problem is not currently available. If, however, it is determined 508 that a solution does exist, the solution to the problem may be transmitted 512 to the second device. As a result, the second device 106 may then provide the solution to the first device 102 via connection between the second device 106 and the first device 102.

The present systems and methods, as demonstrated above, provide the ability for a user to easily connect with the producer of a software product and provide pertinent information regarding a problem. The producer of the software product may be able to gain information about problems in that software product that should be addressed. The present systems and methods may also provide the ability for the user to troubleshoot the problem from a device that is not having the problem itself. This may be desirous because many times problems may cause machines to not function properly. Also, it may be dangerous for the problematic machine to be connected to an outside network (in order to report the problem) because of security issues.

Figure 6:
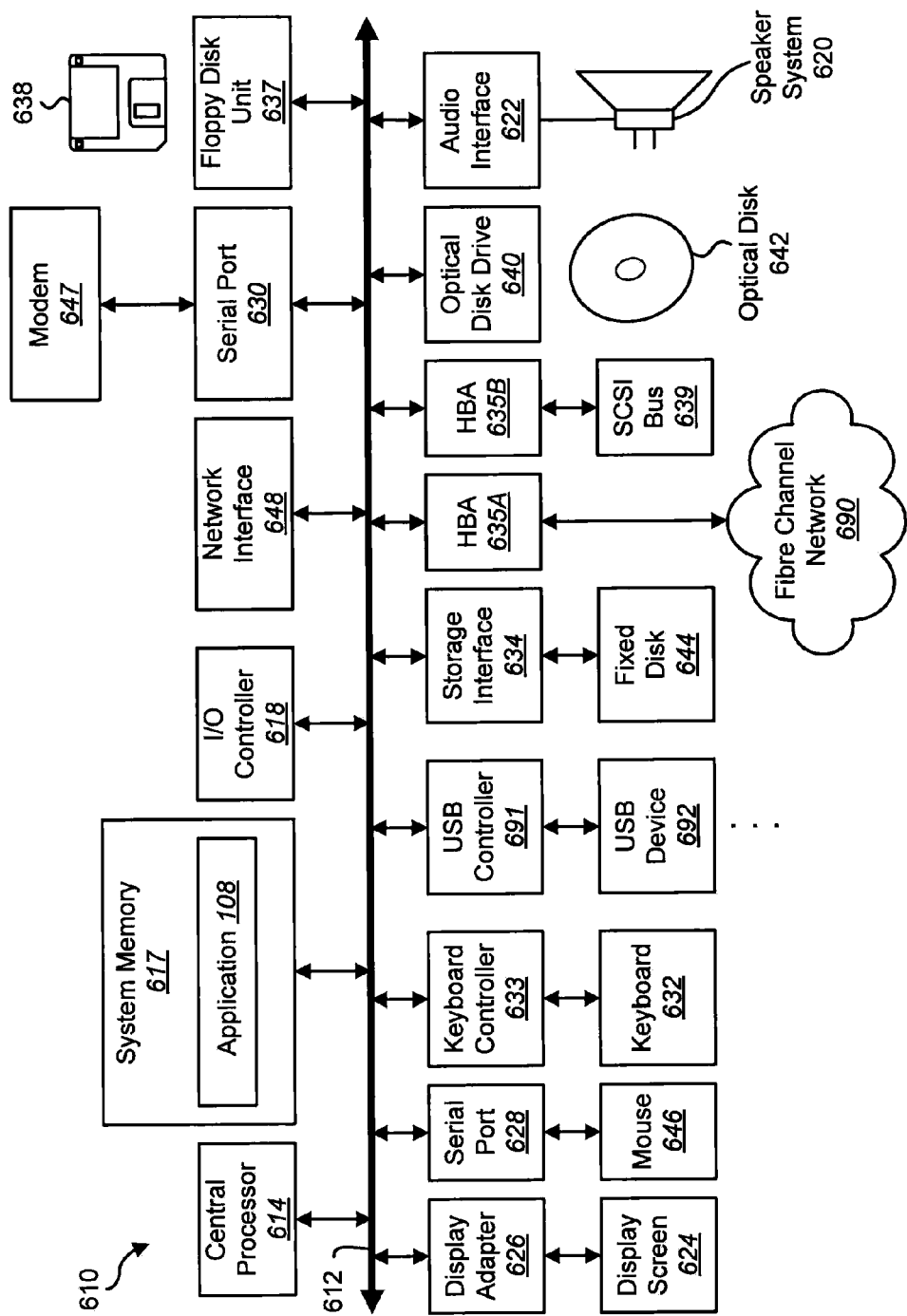
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 690), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the application 108 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
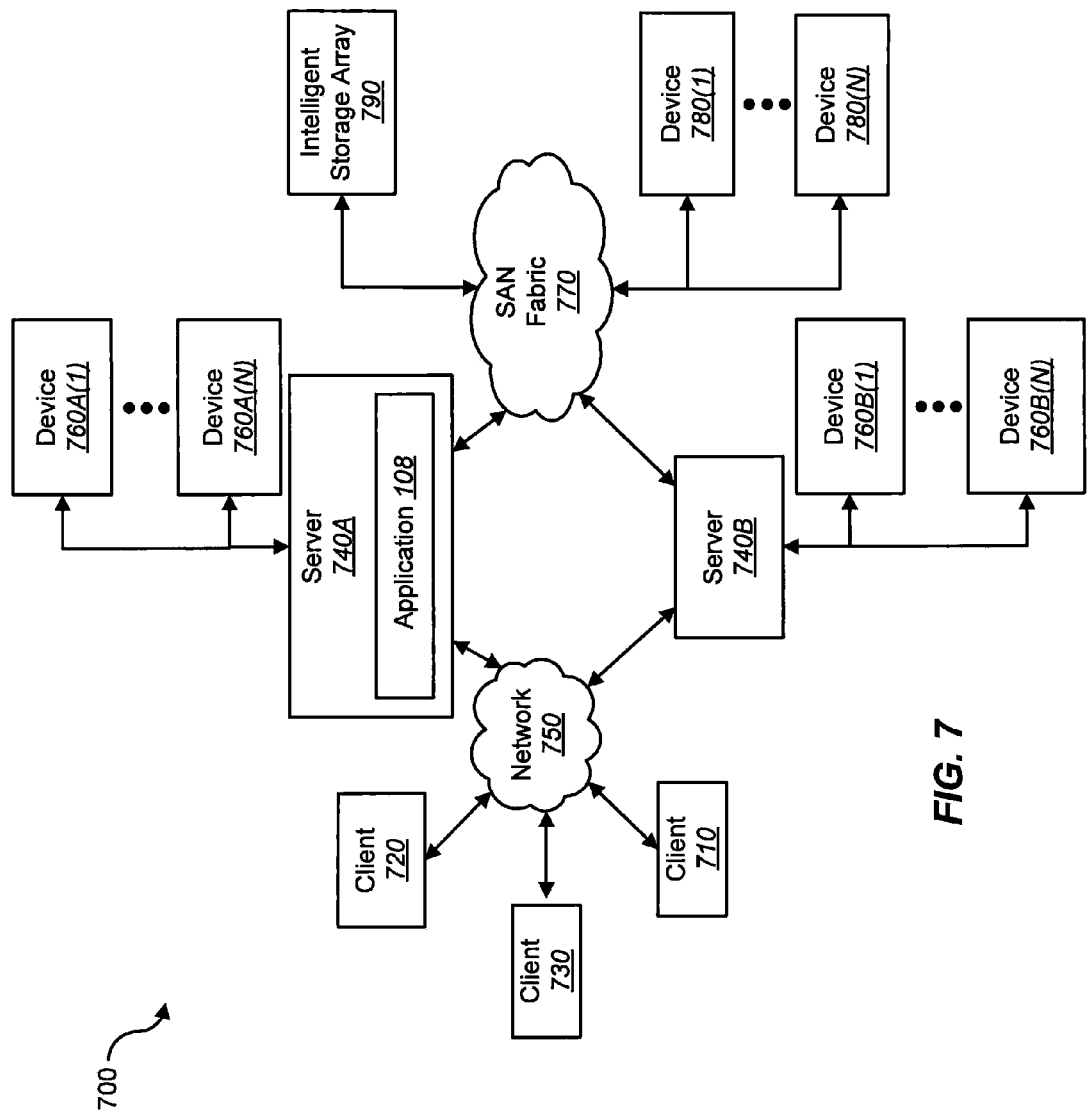
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A and 740B (any of which can be implemented using computer system 610), are coupled to a network 750. In one embodiment, the application 108 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to remotely troubleshoot a software problem occurring on a first device, comprising:
    establishing, by a second device, a connection with the first device, the first and second devices being personal computing devices;
    extracting, by the second device, a first set of information from the first device;
    providing, at the second device, a user interface via a display in order to receive a second set of information; and
    transmitting, by the second device, the first set of information and with the second set of information to a third device.

2. The method of claim 1, further comprising receiving, at the second device, a solution to the software problem from the third device.

3. The method of claim 2, further comprising providing, by the second device, the solution to the software problem to the first device via the established connection between the first device and the second device.

4. The method of claim 1, wherein the first set of information comprises information relating to the software problem occurring on the first device.

5. The method of claim 1, wherein the first set of information comprises information relating to a current state of the first device.

6. The method of claim 1, wherein the second set of information comprises input from a user relating to the software problem occurring on the first device.

7. The method of claim 1, further comprising arranging the second set of information into a predetermined format to be received by the third device.

8. The method of claim 1, wherein the first device comprises a personal computing device and the second device comprises a smartphone computing device.

9. The method of claim 1, wherein the solution to the software problem comprises instructions to troubleshoot the software problem occurring on the first device.

10. A computing device configured to remotely troubleshoot a software problem occurring on a second device, comprising:
   a processor;
   memory in electronic communication with the processor;
   an application configured to:
      establish a connection between the computing device and the second device, the computing and second device being personal computing devices;
      extract a first set of information from the second device;
   a display configured to provide a user interface in order to receive a second set of information; and
   the application further configured to transmit the first set of information with the second set of information to a third device.

11. The computing device of claim 10, wherein the application is further configured to receive a solution to the software problem from the third device.

12. The computing device of claim 11, wherein the application is further configured to provide the solution to the software problem to the second device via the established connection between the computing device and the second device.

13. The computing device of claim 10, wherein the first set of information comprises information relating to the software problem occurring on the second device.

14. The computing device of claim 10, wherein the first set of information comprises information relating to a current state of the second device.

15. The computing device of claim 10, wherein the second set of information comprises input from a user relating to the software problem occurring on the second device.

16. The computing device of claim 10, wherein the application is further configured to arrange the second set of information into a predetermined format to be received by the third device.

17. The computing device of claim 10, wherein the computing device comprises a smartphone computing device and the second device comprises a personal computing device.

18. The computing device of claim 10, wherein the solution to the software problem comprises instructions to troubleshoot the software problem occurring on the second device.

19. A computer-program product to remotely troubleshoot a software problem occurring on a first device, the computer-program product comprising a non-transitory computer-readable medium having instructions thereon, the instructions comprising:
   code programmed to establish a connection with the first device from a second device, the first and second devices being personal computing devices;
   code programmed to extract a first set of information from the first device;
   code programmed to provide a user interface via a display in order to receive a second set of information; and
   code programmed to transmit the first set of information with the second set of information to a third device.

20. The computer-program product of claim 19, wherein the instructions further comprise code programmed to receive a solution to the software problem from the third device.

* * * * *